United States Patent [19]
Wilfert

[11] 3,968,977
[45] July 13, 1976

[54] TILTABLE INDICIA CONSTRUCTED AS RADIATOR EMBLEM

[75] Inventor: Karl Wilfert, Gerlingen-Waldstadt, Germany

[73] Assignee: Daimler-Benz Aktiengesellschaft, Germany

[22] Filed: Nov. 13, 1974

[21] Appl. No.: 523,416

[30] Foreign Application Priority Data
Nov. 14, 1973 Germany............................ 2356761

[52] U.S. Cl. ............................... 280/727; 40/129 C
[51] Int. Cl.² ......................................... B60R 13/04
[58] Field of Search........... 40/145 A, 125 N, 129 C, 40/67; 280/150 R, 150 B

[56] References Cited
UNITED STATES PATENTS
1,845,774  2/1932  Wilson ......................... 40/125 N X
2,519,145  8/1950  Manly ........................... 40/145 A X
3,813,113  5/1974  Burnham......................... 280/150 R FOREIGN PATENTS OR APPLICATIONS
355,366  8/1961  Switzerland..................... 280/150 B Primary Examiner—Hugh R. Chamblee
Assistant Examiner—Wenceslao J. Contreras
Attorney, Agent, or Firm—Craig & Antonelli

[57] ABSTRACT

A sign, for example, in the form of the company's trademark which is constructed as radiator figure adapted to be recessed and tilted by a force of predetermined magnitude; the radiator figure thereby normally projects above the body of the motor vehicle, particularly above the radiator or engine hood and is so constructed that the base of the radiator figure is mounted in a recess provided in the engine hood and carries a joint which permits a tilting over of the radiator figure into the recess so that neither parts of the radiator figure nor of the base thereof project beyond the edges of the recess.

10 Claims, 6 Drawing Figures

FIG. 1
FIG. 2
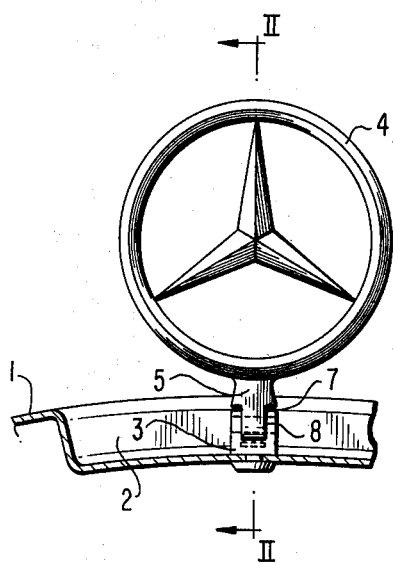
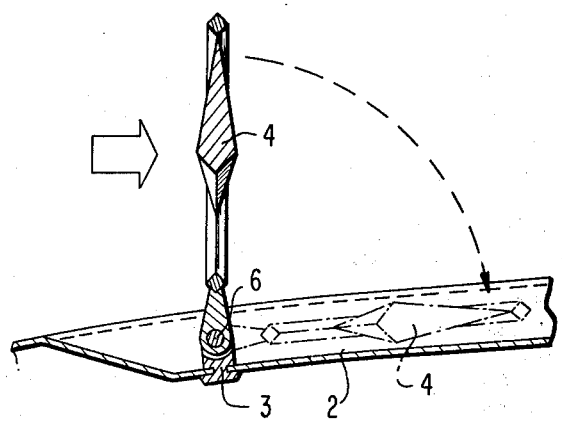
FIG. 3
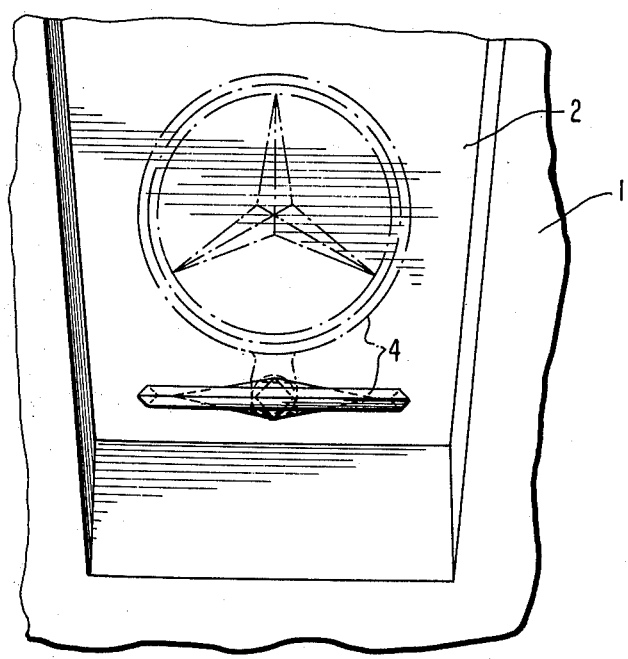

TILTABLE INDICIA CONSTRUCTED AS RADIATOR EMBLEM

The present invention relates to the construction of a motor vehicle and more particularly to a sign or indicia constructed as radiator figure which preferably projects above the radiator or engine hood and is adapted to be tilted off and recessed by a force of predetermined magnitude.

Tiltable company signs or marks and collapsible radiator figures or emblems are known in the prior art.

With the hertofore known tiltable radiator figures, the base thereof was disposed on the radiator mask and held by a spring, could be tilted off toward many sides. However, also in the tilted off condition, sharp-edged portions of the radiator figure or of the base thereof projected above the body surface so that these parts of the radiator figure which project above the body, could still become dangerous in case of accidents, notwithstanding their tilted-down or swung out condition. Therebeyond, it happens frequently that when driving through automatic car-wash installations, the radiator figure or the company sign was tilted so far toward the rear that the hook at which the spring is suspended, is being bent up or the radiator figure breaks off.

The hitherto known recessed arrangements for radiator figures entail the disadvantage that the radiator figures can be recessed only partly and in that the expenditures required therefor are disproportionately large.

It is the aim of the present invention to avoid the aforementioned disadvantages and to provide a radiator figure which after being tilted over, no longer possesses any projecting points of engagement. The underlying problems are solved according to the present invention in that the base of the radiator figure is mounted within an identation or recess provided in the engine hood and carries a joint which permits a tilting over of the radiator figure into the recess so that neither parts of the radiator figure nor of its base project beyond the edges of the indentation or recess. It is assured by such an accommodation and mounting of the radiator figure in a recess or indentation that the radiator figure no longer projects beyond the engine hood in the tilted-off condition. According to a further feature of the present invention, the base of the radiator figure may carry a shaft whose longitudinal direction extends transversey to the driving direction of the vehicle and about which the radiator figure is adapted to be tilted into the recess or indentation. The foot portion of the company sign and its base may be provided thereby with detents which interengage with each other and which in cooperation with the elasticity of the shaft, determine the force necessary for tilting away the company sign. On the other hand, the radiator figure may be secured at the base by means of a universally pivotal ball joint which includes a guidance that guides the radiator figure in the nearly tilted over condition in the longitudinal direction also in case of a tilting force impinging on the radiator figure from a lateral direction. According to another embodiment of the present invention, the force necessary for tilting the radiator figure can be determined by the friction coefficient existing between the bearing support of the foot portion of the sign and the shaft or base.

Accordingly, it is an object of the present invention to provide a sign adapted to be tilted away and constructed as radiator figure which avoids by simple means the aforementioned shortcomings and drawbacks encountered in the prior art.

Another object of the present invention resides in a radiator figure adapted to be tilted away upon application of a force which in the tilted away condition, has no parts projecting above the vehicle body.

A further object of the present invention resides in a sign constructed as radiator figure which permits the figure to be completely recessed, yet involves relatively slight expenditures.

Still a further object of the present invention resides in a radiator figure of the type described above which is not only simple in construction but achieves greater safety than attainable heretofore without excessive expenditures.

These and other objects, features and advantages of the present invention will become more apparent from the following description when taken in connection with the accompanying drawing which shows, for purposes of illustration only, two embodiments, and wherein:

FIG. 1 is a transverse cross-sectional view through a part of the engine hood provided with an indentation or recess and with a company sign mounted therein by means of a shaft;

FIG. 2 is a cross-sectional view, taken along line II—II of FIG. 1 with the company sign in the tilted-up condition in full lines and in the tilted-down condition in dash lines;

FIG. 3 is a plan view on the radiator figure according to FIGS. 1 and 2, again showing the same in the tilted up condition in full line and in the tilted-away condition in dash line;

Figure 4:
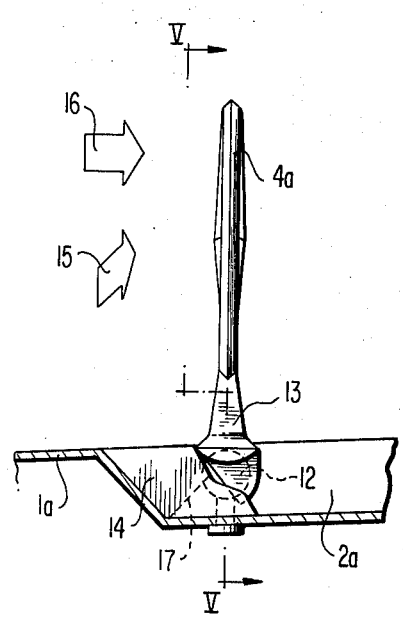
FIG. 4 is a longitudinal cross-sectional view through a part of the engine hood provided with a recess or indentation and a company sign mounted within the same by means of a ball joint.

Referring now to the drawing wherein like reference numerals are used throughout the various views to designate like parts, the engine hood 1 illustrated in the drawing is provided with an indentation or recess 2. According to the illustration in FIGS. 1 to 3, the base 3 of the company sign is secured in this recess 2 by rivets. The foot portion 5 of the company sign 4 is pivotally connected with the base 3 of the company sign by a shaft or pin 6. The jointed connection may be so constructed that the foot portion 5 is seated on the shaft 6 with a press fit so that the company sign 4 is retained normally in the position illustrated in FIG. 1. Upon contact, it can be deflected or pivoted into the position illustrated in dash line in FIGS. 2 and 3. The friction necessary for maintaining the company sign 4 upright can also be ensured in that detents are provided on the oppositely disposed surfaces of the foot portion 5 and of the base 3 at the places 7 and/or 8.

Figure 5:
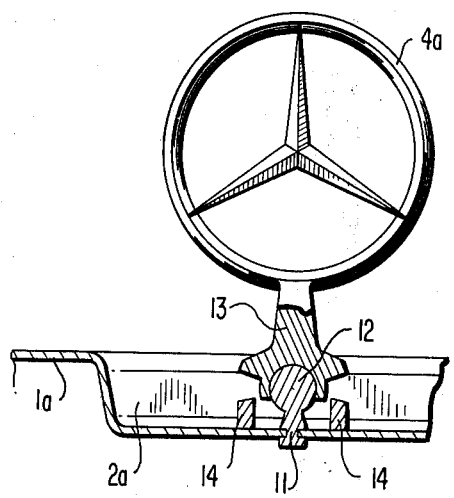
FIG. 5 is a front elevational view of the company sign illustrated in FIG. 4, partly in cross section, taken along line V—V in FIG. 4.
Figure 6:
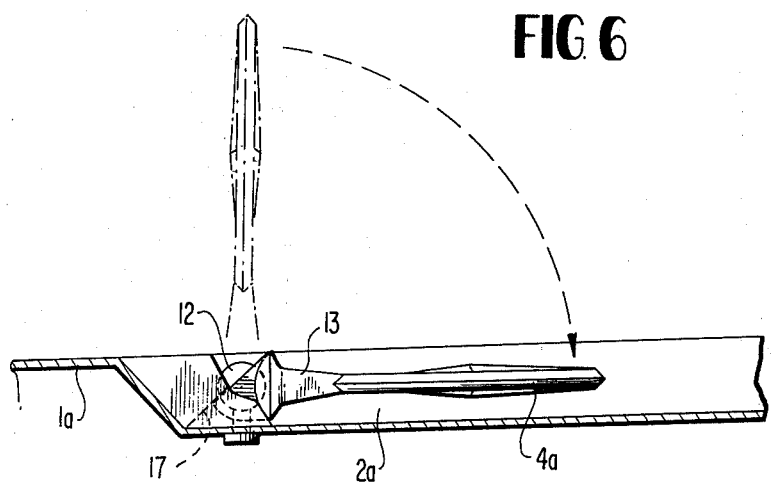
FIG. 6 is a longitudinal cross-sectional view similar to FIG. 4, but showing the company sign in the tilted over condition.

In a further embodiment illustrated in FIGS. 4 to 6, the base 11 of the company sign 4a which is riveted in the recess or indentation 2a of the engine hood 1a may carry a ball 12.

The foot portion 13 of the radiator FIG. 4a is matched to the ball 12 so that the radiator FIG. 4a is secured at the base 11 by means of a universally pivotal ball joint. Additionally, a guide member 14 is mounted in the recess 2a which guides the radiator FIG. 4a in the longitudinal direction also in case of a deflecting force impinging in a lateral direction according to the arrow 15 when the company sign 4a during the tilting over approaches the end position of the tilting over operation so that the company sign then assumes the same end position into which it would arrive customarily when a tilting force in the direction of arrow 16 acts thereon. In the end position illustrated in FIG. 6, the foot portion 13 of the radiator FIG. 4a also finds an abutment or stop 17 which is constituted by the guide member 14 itself.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A company sign constructed as radiator figure which is adapted to be recessed and operable to be tilted over by a force of predetermined magnitude and which projects beyond the body of a motor vehicle, characterized in that the radiator figure includes a base means mounted within a recess provided in the engine hood and carrying a joint means which enables a tilting over of the radiator figure into the recess in such a manner that neither parts of the radiator figure nor of the base means project beyond the edges of the recess.

2. A company sign according to claim 1, characterized in that the radiator figure normally projects beyond the radiator.

3. A company sign according to claim 1, characterized in that the radiator figure normally projects beyond the engine hood.

4. A company sign according to claim 1, characterized in that the base means carries a shaft means whose longitudinal direction extends transversely to the driving direction of the vehicle, the radiator figure being adapted to be tilted into the recess about said shaft means.

5. A company sign according to claim 4, characterized in that the radiator figure includes a foot portion, said foot portion and said base means including detent means which inter-engage with one another and which in cooperation with the elasticity of the shaft means, determine the force necessary for tilting over the company sign.

6. A company sign according to claim 1, characterized in that the radiator figure is secured at the base means by way of a universally pivotal ball joint means which includes a guide means that guides the radiator figure in the longitudinal direction in the nearly tilted over condition also in case of impingement thereon of a tilting-over force in the lateral direction.

7. A company sign according to claim 6, characterized in that the force necessary for tilting over is determined by the friction coefficient existing between the bearing support of the foot portion of the company sign and the base means.

8. A company sign according to claim 4, characterized in that the force necessary for tilting over is determined by the friction coefficient existing between the bearing support of the foot portion of the company sign and one of the two parts consisting of shaft and base means.

9. A company sign according to claim 1, characterized in that the force necessary for tilting over is determined by the friction coefficient existing between the bearing support of the foot portion of the company sign and the base means.

10. A company sign according to claim 9, characterized in that the radiator figure normally projects beyond the engine hood.

* * * * *